No. 866,319. PATENTED SEPT. 17, 1907.
C. H. ZORGER & H. O. JENSEN.
ROTARY ENGINE.
APPLICATION FILED JUNE 18, 1907.

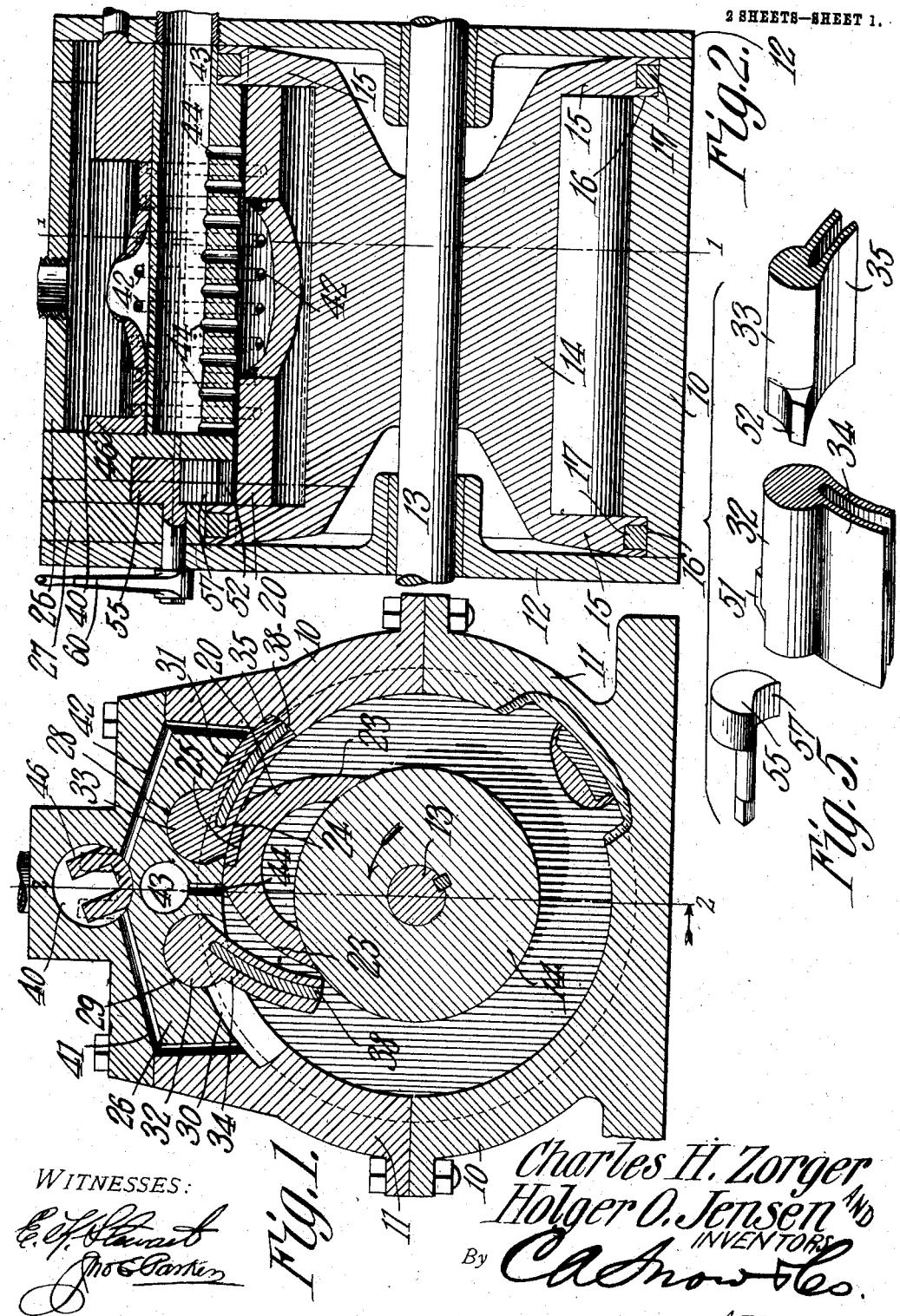

2 SHEETS—SHEET 2.

Charles H. Zorger,
Holger O. Jensen,
INVENTORS

WITNESSES:

By

ATTORNEYS

THE NORRIS PETERS CO., WASHINGTON, D. C.

UNITED STATES PATENT OFFICE.

CHARLES H. ZORGER AND HOLGER OSCAR JENSEN, OF RANTOUL, ILLINOIS.

ROTARY ENGINE.

No. 866,319.          Specification of Letters Patent.          Patented Sept. 17, 1907.

Application filed June 18, 1907. Serial No. 379,640.

*To all whom it may concern:*

Be it known that we, CHARLES H. ZORGER and HOLGER OSCAR JENSEN, citizens of the United States, residing at Rantoul, in the county of Champaign and State of Illinois, have invented a new and useful Rotary Engine, of which the following in a specification.

This invention relates to rotary engines, and has for its principal object to provide an engine of simple and compact construction possessing but few working parts, and so arranged as to permit the economical use of steam or other fluid for motor purposes.

A further object of the invention is to provide an engine of this class which may be readily reversed when necessary and in which the movable abutment or abutments are so disposed as to form when in retracted position a part of the wall of the cylinder or working space of the engine.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 3:
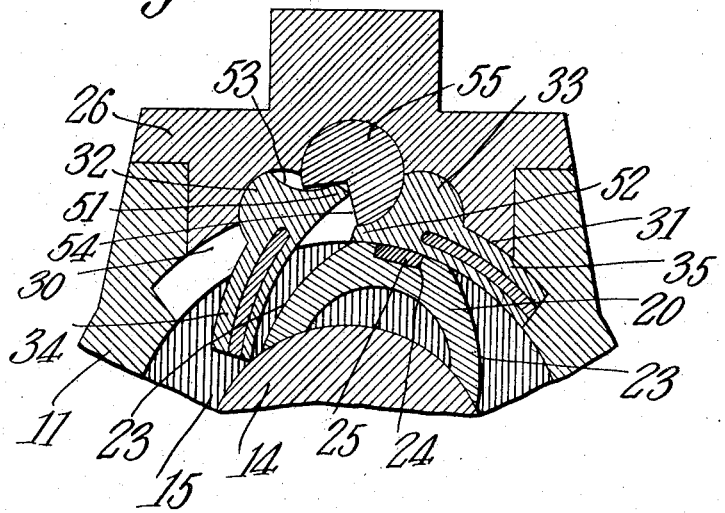
Figure 4:
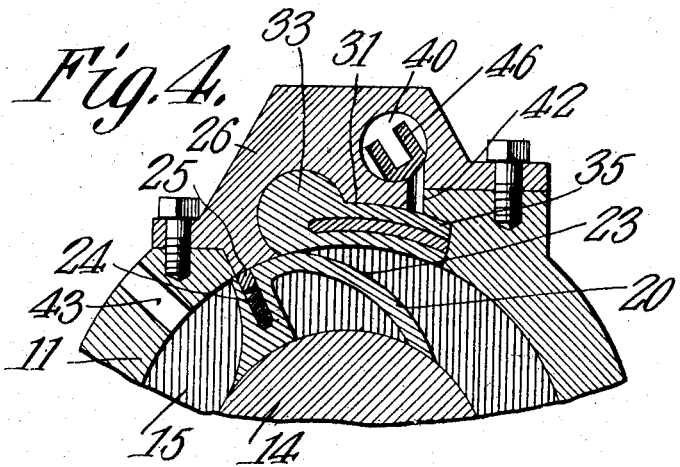

In the accompanying drawings:—Figure 1 is a sectional elevation of a rotary engine constructed in accordance with the invention. Fig. 2 is a longitudinal sectional view of the same on the line 2—2 of Fig. 1. Fig. 3 is a transverse section of a portion of the engine on the line 3—3 of Fig. 2. Fig. 4 is a sectional view illustrating a slight modification. Fig. 5 is a detail perspective view of portions of the abutments and the abutment reversing device detached.

Similar numerals of reference are employed to indicate corresponding parts throughout the several figures of the drawings.

The cylinder is preferably formed of two sections 10 and 11 having suitable bolting flanges, while the base section is extended to form a sole plate. These two sections are bored out to form a cylinder ring, and to the opposite sides of the ring are bolted heads 12, the central portions of which are provided with inwardly extending bearings for the reception of a main shaft 13.

Secured to the shaft is a piston drum 14 having annular end cylinders 15 that fit within annular grooves 16 formed at the ends of the cylinder ring, and the periphery of each flange is grooved for the reception of a suitable packing ring 17 for the purpose of preventing the leakage of the actuating fluid. The opposite ends of the piston drum are recessed in order to clear the bearings of the shaft.

Secured to the periphery of the piston drum is a piston wing 20 which in the construction shown in Fig. 1 is provided with two convex pressure areas 23, against one or other of which the actuating fluid directs its force in accordance with the direction of rotation of the piston. The piston wing is provided with a radially arranged groove 24 for the reception of a packing strip 25 that bears constantly against the circular inner wall of the cylinder to form a steam tight joint.

The top of the upper section 11 of the cylinder is cut away forming a rectangular recess for the reception of two blocks 26 and 27, the inner faces of which are curved to follow the contour of the inner wall of the cylinder, and both sections are provided with a pair of parallel recesses 28, 29, in the form of incomplete cylinders in cross section, these recesses communicating with recesses 30—31, respectively, the walls of the latter recesses being on lines concentric with the inner curved wall of the cylinder, and both sets of recesses opening into the cylinder.

Mounted in the circular recesses 28—29 are the stems 32—33 of abutments 34—35, said abutments being movable into the recesses 30—31, and when in this position their inner walls form a part of the curved wall of the working space of the engine. The abutments may, also, move down across the working space into contact with the periphery of the piston drum, and when in this position form the stationary surfaces of the expansion space.

The abutments 34—35 act alternately, that is to say, the abutment 34 is in constant operation while the piston drum is rotating in the direction indicated by the arrow in Fig. 1, while the abutment 35 becomes active when the engine is to rotate in the opposite direction. Provision is made for locking the idle abutment in inoperative position within its receiving recess in order that it may not interfere with the free rotation of the piston.

The abutment members are inserted endwise in the recesses of the receiving block 26 before the latter is placed in position in the section 11 of the cylinder, and it will be noted on reference to Fig. 2 that the end walls of the abutments are within the annular flanges 15 of the piston, so that there can be no endwise displacement of such abutments. The ends of the abutments are, furthermore, grooved for the reception of packing strips 38 which may be forced out by suitable springs into engagement with the inner vertical walls of the flanges 15.

In the upper portion of the block 26 is a steam chest 40 from which lead two ports 41 and 42 to the recesses 30—31, the terminals of the ports being above the abutments 34—35, so that the steam in passing through the ports will tend to force the abutment down into engagement with the periphery of the piston. The block 26 furthermore contains an exhaust channel 43 which communicates with the working space of the cylinder through a number of exhaust ports 44, that are located between the two abutments.

Arranged in the steam chest is an oscillatory valve 46 which may be adjusted to close either the port 41 or the port 42, in accordance with the direction in which the piston is to rotate, and aside from this adjustment, the valve may be rocked for the purpose of controlling the flow of steam through the active port, and any suitable valve gearing may be employed, so that the steam may be cut off at any point in the stroke and used expansively for the remaining portion of the stroke. As the valve gear may be of any type in common use, and forms no part of the present invention, it has not been illustrated in the drawings.

Those portions of the abutments which extend through the block 27 are provided with projecting ears 51—52 and with curved recesses 53—54, the recesses being arranged to receive an approximately cylindrical reversing block 55 that is arranged in a suitable recess formed in the block 27. One side of the block is cut away to form a recess 57 into which either of the ears 51 or 52 may be received, and by turning the reversing block in one direction or the other, one of the abutments may be positively locked in inoperative position while the other is left free to move into and from its recess as dictated by the piston wing 20.

At the end of the reversing block 55 is a stem extending through a suitable stuffing box, and to the stem is secured a suitable reversing lever 60 which may be manipulated for the purpose of adjusting the position of the block, and so controlling the direction in which the engine is to rotate.

In operation, the reversing block 55 is first moved to lock one of the abutments and unlock the other, and then the valve mechanism is adjusted accordingly. If the engine is to rotate in the direction indicated by the arrow in Fig. 1, the abutment 34 will be free and the steam passing through the port 41 will tend to force the abutment 34 down into contact with the piston. As the piston wing approaches the rear curved face of the abutment, it will force the latter up into its recess 30, and after the piston wing passes beyond the abutment, the steam pressure passing through the port 41 will throw the abutment down to the rear of the piston wing, and steam will pass from the port into the working space formed between the abutment, the wing, the periphery of the piston, and the inner curved wall of the cylinder. The valve may be moved to cut off the steam at any point in the stroke, and the steam thereafter may be used expansively.

It is obvious that the invention may be applied to engines having but a single abutment arranged to rotate in but one direction, as shown, for instance, in Fig. 4, where the construction and arrangement of the parts is exactly the same as that already described, with the exception that a single abutment and single steam port are used, while the shape of the pressure area of the piston wing is slightly altered in order to facilitate the movement of the abutment in contact with the periphery of the piston.

We claim:—

1. In a rotary engine, a cylinder having a pair of spaced recesses, abutments pivoted therein and provided with recessed stems, a lug projecting from each of the stems, a cylindrical reversing block having a recess engaging with the stems and lugs, a piston arranged within the cylinder, and a piston wing projecting from the piston and arranged to coöperate with either of the abutments.

2. In a rotary engine, a cylinder having a pair of spaced recesses, abutments pivoted therein and having their inner walls curved to conform to the contour of the cylinder wall, lugs projecting from the abutments, a reversing block having a recess arranged to receive one of the lugs, the block serving also to engage the other lug and lock its abutment in inoperative position, a piston drum within the cylinder, a piston wing carried by the drum and arranged to coöperate with either of the arms in accordance with the direction of rotation of the piston, a pair of steam inlet ports leading to the abutment recesses, and a single valve for controlling the flow of the actuating fluid through the ports.

3. In a rotary engine, a cylinder, a pair of detachable blocks forming a part of the wall of the cylinder and secured thereto, the inner faces of said blocks being recessed, a pair of abutments having stems pivotally mounted in the blocks, and blade portions fitting within the recesses of one of the blocks, a steam chest, a pair of steam ports leading therefrom and opening into the abutment recesses, whereby the pressure of steam tends to move the abutments from the recesses, a reversing valve arranged within the steam chest and controlling the ports, lugs projecting from the abutment, stems at points within the other block, a cylindrical reversing block having a recess into which either of the lugs may enter to release one of the abutments while the other is locked in inoperative position, a piston drum having end flanges fitting within annular grooves at the ends of the cylinder and serving to hold the abutments from endwise displacement, and a piston wing secured to the drum, said wing having curved faces arranged to coöperate with either of the abutments in accordance with the direction of rotation of the piston.

In testimony that we claim the foregoing as our own, we have hereto affixed our signatures in the presence of two witnesses.

CHARLES H. ZORGER.
HOLGER OSCAR JENSEN.

Witnesses:
GEO. WOOD,
BART RICE.